(12) United States Patent
Housch

(10) Patent No.: US 11,818,628 B2
(45) Date of Patent: Nov. 14, 2023

(54) WEARABLE TRACKING DEVICE AND SYSTEM FOR TRACKING PEOPLE AND PERSONAL ITEMS

(71) Applicant: Robin Dawn Housch, Murfreesboro, TN (US)

(72) Inventor: Robin Dawn Housch, Murfreesboro, TN (US)

( * ) Notice: Subject to any disclaimer, the term of this patent is extended or adjusted under 35 U.S.C. 154(b) by 170 days.

(21) Appl. No.: 17/399,414

(22) Filed: Aug. 11, 2021

(65) Prior Publication Data
US 2022/0053290 A1 Feb. 17, 2022

Related U.S. Application Data

(60) Provisional application No. 63/065,171, filed on Aug. 13, 2020.

(51) Int. Cl.
*H04W 4/029* (2018.01)

(52) U.S. Cl.
CPC .................. *H04W 4/029* (2018.02)

(58) Field of Classification Search
None
See application file for complete search history.

(56) References Cited

U.S. PATENT DOCUMENTS

| | | |
|---|---|---|
| 2006/0267753 A1 | 11/2006 | Hussey et al. |
| 2010/0267361 A1* | 10/2010 | Sullivan .................. G01S 19/17 455/404.2 |
| 2014/0225730 A1 | 8/2014 | DePascale |
| 2016/0078180 A1 | 3/2016 | Stackpole et al. |
| 2018/0260525 A1* | 9/2018 | Rivedal .................. G16H 10/60 |

OTHER PUBLICATIONS

Nov. 15, 2021 Written Opinion and Search Report issued in corresponding PCT Application No. PCT/US2021/045676.
Estes, Adam Clark.(Mar. 28, 2017). How I Let Disney Track My Every Move. https://gizmodo.com/how-i-let-disney-track-my-every-move-1792875386.
Nextnav. Elevating Geolocation.https://nextnav.com/.
TickTalk. TickTalk4.https://www.myticktalk.com/products/ticktalk-4?variant=37710611841194&kbid=62750.
Sentinel. OM400 GPS Trackable Ankle Monitor. https://www.sentineladvantage.com/om400/.
BI Inc.GPS Tracking BI LOC8 XT. https://bi.com/gps/.
AngelSense. AngelSense GPS Tracker for Kids. https://www.angelsense.com/gps-tracker-for-kids/?utm_source=google&utm_campaign=Search_Child_US2&gclid=EAlalQobChMl_4Wn6M-98QlViciUCR3x9QldEAAYASAAEgKB6fD_BwE.
AngelSense. Life-Changing Safety & Independence. https://www.angelsense.com/.

(Continued)

*Primary Examiner* — Adolf Dsouza
(74) *Attorney, Agent, or Firm* — Clements Bernard Walker; Richard A. Walker; Jennifer R. Knight

(57) ABSTRACT

A tracking device is disclosed. The tracking device includes a band, an electronic tracking component, and an image component. The band is adapted to be secured to a body of a person. The electronic tracking component is embedded within the band. The electronic tracking component is configured to track a location of the tracking device and provide the location of the tracking device to a management system. The image component includes an image that is unique to and identifies the person wearing the tracking device.

17 Claims, 10 Drawing Sheets

(56) References Cited

OTHER PUBLICATIONS

AngelSense. Help Your Special Needs Child Reach Their Full Potential. https://www.angelsense.com/teens-and-adults/.
AngelSense.GPS Tracker for Elderly, Dementia, & Alzheimer's. https://www.angelsense.com/gps-tracker-for-elderly/.
AngelSense. Wearable GPS Tracker for Maximum Safety. https://www.angelsense.com/wearable-gps-tracker/.
Polly Klaas Foundation. Child Safety Kit. https://www.pollyklaas.org/product/50-child-safety-kit-booklets/.
Immunaband. Share Your Vaccination Status by Wearing an ImmunaBand Around Your Wrist. https://www.immunaband.com/.
Total Food Service. (Apr. 28, 2021). Immunaband Brings Creative Protocol Strategy to Restaurant and Foodservice Operators. https://totalfood.com/immunaband-brings-creative-protocol-strategy-to-restaurant-and-foodservice-operators/.
Dreier, Natalie. (May 7, 2021). Wearable bracelet could replace coronavirus vaccination cards. https://www.kiro7.com/news/trending/wearable-bracelet-could-replace-coronavirus-vaccinationcards/2ADMV2TOVZEJXAB5FMZJD7FBMY/.

* cited by examiner

WEARABLE TRACKING DEVICE AND SYSTEM FOR TRACKING PEOPLE AND PERSONAL ITEMS

CROSS-REFERENCE TO RELATED APPLICATION

The present disclosure claims the benefit of priority of co-pending U.S. Provisional Patent Application 63/065,171, filed on Aug. 13, 2020, and entitled "WEARABLE TRACKING DEVICE AND SYSTEM FOR TRACKING PEOPLE AND PERSONAL ITEMS," the contents of which are incorporated in full by reference herein.

FIELD OF THE DISCLOSURE

The present disclosure generally relates to systems and methods for tracking individuals. More particularly, the present disclosure relates to systems and methods for systems and methods for tracking individuals by associating a specific image with each individual.

BACKGROUND OF THE DISCLOSURE

Kids and the elderly (such as those with dementia) often wander off and can get lost. This can happen at any time, while shopping, at an amusement park, at a group home, at the park, and the like. Those caring for or supervising individuals need peace of mind that they can easily find those they care for and that others will be able to quickly identify the individual that is missing or be able to quickly identify people that are associated with those individuals.

BRIEF SUMMARY OF THE DISCLOSURE

In one exemplary embodiment, the present disclosure provides a tracking device. The tracking device includes a band, an electronic tracking component, and an image component. The band is adapted to be secured to a body of a person. The electronic tracking component is embedded within the band. The electronic tracking component is configured to track a location of the tracking device and provide the location of the tracking device to a management system. The image component includes an image that is unique to and identifies the person wearing the tracking device.

In one embodiment, the image component is a separate component that is joined to the band and is joined to the band by one of sewing, fastening, and snapping via a snap-fit.

In another embodiment, the image component includes a plurality of images including the unique image and an image identifying one of a supervisor and a group associated with the person wearing the tracking device.

In a further embodiment, the tracking device further includes a locking mechanism that is adapted to prevent the wearer from removing the tracking device.

In yet another embodiment, the tracking device further includes a scannable code configured to identify the person wearing the tracking device. Optionally, the scannable code is embedded in an image of the image component.

In still another embodiment, the image that is certified by the management system as being unique prior to being applied to the tracking device.

In a further embodiment, the electronic tracking component is configured to transmit the location of the tracking device to the management system on a predetermined interval.

In another exemplary embodiment, the present disclosure provides a tracking system. The tracking system includes a tracking device and a management system. The tracking device includes a band, an electronic component, and an image component. The band is adapted to be secured to a body of a person. The electronic tracking component is embedded within the band. The electronic tracking component is configured to track a location of the tracking device and transmit the location of the tracking device. The image component includes an image that is unique to and identifies the person wearing the tracking device. The management system is configured to receive the location transmitted by the tracking device, provide location information of the electronic tracking component to a user authorized to obtain the location information, and store a copy of the image that is unique to and identifies the person wearing the tracking device and associate the image with the tracking device.

In one embodiment, the image component is a separate component that is joined to the band and is joined to the band by one of sewing, fastening, and snapping via a snap-fit.

In another embodiment, the image component includes a plurality of images including the unique image and an image identifying one of a supervisor and a group associated with the person wearing the tracking device and the management system further associates the image identifying the one of the supervisor and the group with the unique image.

In a further embodiment, the tracking device further includes a locking mechanism that is adapted to prevent the wearer from removing the tracking device.

In yet another embodiment, the tracking device further includes a scannable code configured to identify the person wearing the tracking device. Optionally, the scannable code is embedded in an image of the image component.

In still another embodiment, the management system is configured to certify the image as being unique prior to the image being applied to the tracking device.

In a further embodiment, the electronic tracking component is configured to transmit the location of the tracking device to the management system on a predetermined interval.

In a further exemplary embodiment, the present disclosure provides a method for tracking an individual with a management system of a tracking system. The method includes receiving an image from a user and associating the image with a tracking device, the image being unique to the wearer of the tracking device, the tracking device including a band adapted to be secured to a body of the wearer, an electronic tracking component embedded within the band configured to track a location of the tracking device and provide the location of the tracking device to a management system, and an image component including the image. The method also includes receiving the location transmitted by the tracking device. The method further includes providing location information of the tracking device to a user authorized to obtain the location information.

In one embodiment, the method further includes providing the image to a manufacturing facility for manufacturing the image component and for manufacturing merchandise with the image printed thereon.

In another embodiment, the method further includes associating a second image with the image, the second image identifying one of a supervisor and a group associated with the person wearing the tracking device.

In a further embodiment, the image is certified by the management system as being unique prior to being applied to the tracking device.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

Figure 1:
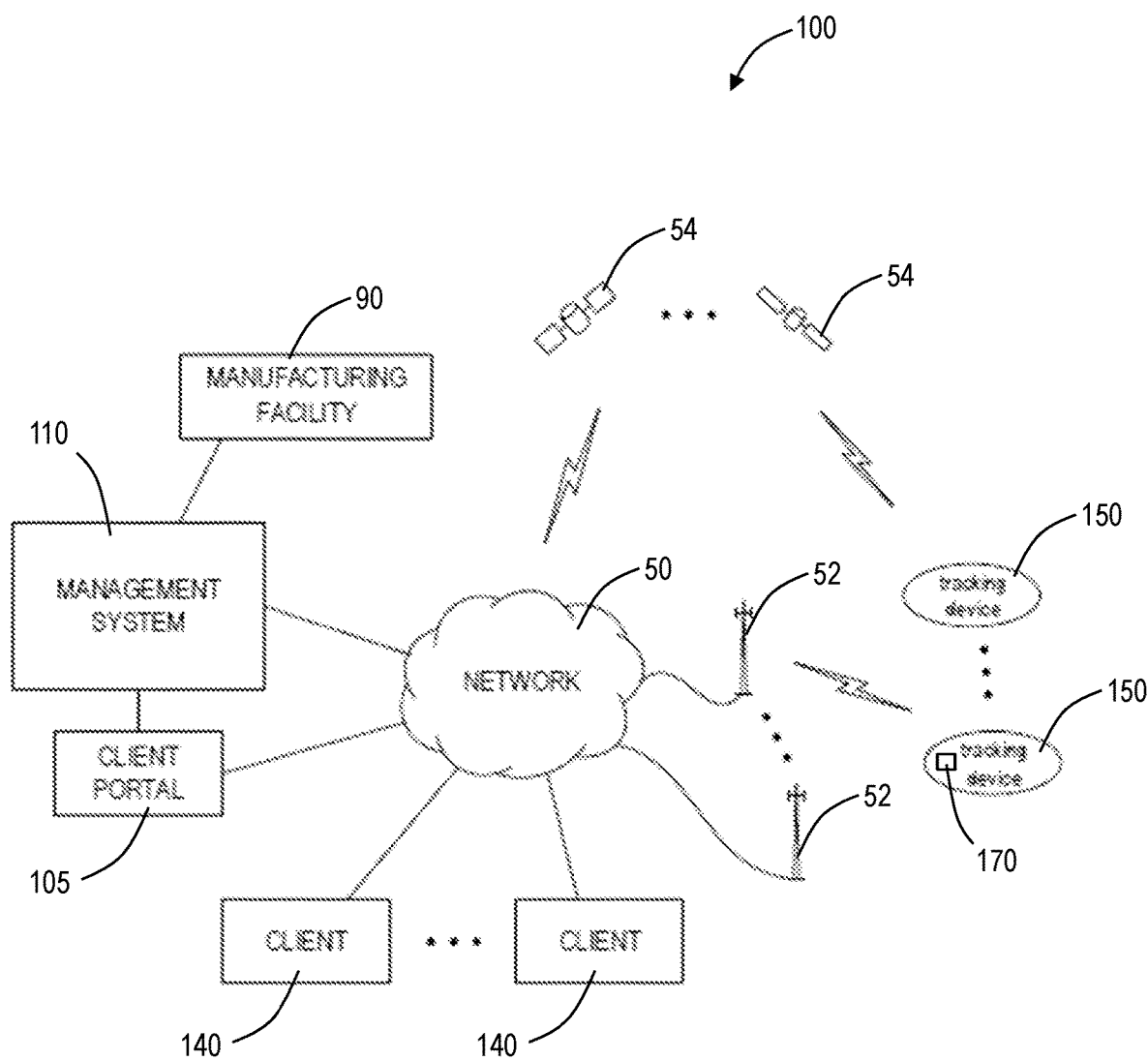
FIG. 1 is a block diagram illustrating an embodiment of a tracking system.

In various embodiments, the present disclosure relates to systems and methods for tracking individuals and for associating a specific image with each individual. The present disclosure includes embodiments of electronic identification systems for tracking individuals and for using a customized image to associate an individual with other individuals, his or her personal belongings, and the like. The systems include wearable tracking devices that can be worn by an individual. Each wearable tracking device is configured to uniquely identify a particular person. The tracking devices can be configured as wristbands, ankle bands, neck bands, bracelets, necklaces, lanyards, or other suitable strap, band, etc. that can be installed around a part of the body of the wearer. In some cases, the tracking devices can be installed on the wearer in a way that would be extremely difficult for the wearer to remove. In other embodiments, the tracking devices may be sewn into garments (e.g., shirts, pants, pajamas, hats, scarves, etc.) that may be worn by the person being tracked.

The tracking system of the present disclosure was created based on a need to provide peace of mind and security to clients (e.g., parents who wish to track their children, medical staff who wish to track patients, eldercare staff who wish to track senior adults, parole officers who wish to track parolees, bondsmen who wish to track criminal defendants, law enforcement personnel who wish to track criminals or suspects, etc.). In addition to using an electronic tracking device that uniquely identifies an individual, the present disclosure may also be configured to include a customized identifying image that may be used as a visual identifier. This customized image may be recorded as a corresponding identifier that is associated with data related to a specific individual being tracked. The image may be applied to, sewn on, or otherwise affixed to certain personal items to assist with keeping personal items with their owners. Thus, not only can a person be tracked, but also their personal items can be associated with them for providing a level of security of personal items as well.

Therefore, the tracking system can be associated with a system that assigns a single, custom image with each person. This familiar visual may be specific to each individual and may be recognizable to caregivers, fellow patients, family members, hospital staff, nursing home staff, and others who may manage or supervise these individuals. One of the goals of the present systems is to alleviate frustrations by providing an organized system based on visual familiarization.

The present systems and methods may be an asset and benefit to patients and staff. As a patient makes life changes and transitions into a care facility while also facing mental challenges (e.g., Alzheimer's, dementia, etc.), how this change is perceived can be pivotal in its success. Instead of utilizing standard care facilities in a traditional manner, the systems and methods of the present disclosure change how the process looks to family members and patients. In this way, the present systems can bring familiarity, warmth, and a sense of home to each patient through its image-based recognition methodology. By providing a more customized living space through this image recognition, one of the goals of the present disclosure is to make the patients feel secure in this new environment.

For example, in order to coordinate living items for an individual, various personal belongings can be customized with a unique image for that individual. The customized personal items may include, among other things: Commode Covers, Remote Controls, Closet Doors, Lamps, Garment Racks, Door Plaques, Artwork with Image, Headboards, Wheelchair Monogram, Shower Chairs, etc.

The customization of personal items can be a great organizational opportunity for care facilities, such as hospitals, nursing homes, assisted living facilities, etc. Customizing personal items with the single image allows caregivers to easily recognize to whom the items belongs and gives a sense of peace and comfort to the patients through repetitive familiarity. Another feature regarding the personal items with the customized image, is that it also allows family members to purchase gifts or other special items such that the single image theme may be constant or include a unique theme. The systems may have the option of setting up a family member portal for ordering or purchasing these items. The items may have the custom image utilizing vinyl, screen printing, patches, embroidery, or other type of media, depending upon the item. Some examples may include Clothing, Shirts, Pants, Socks, Sweaters, Jackets, Coats, Hats, Gloves, Pajamas, Slippers, Linens, Blanket, Sheets, Pillowcases, Bedspreads, Mattress Covers, Towels, Shower Curtains, Chairs, Kindle Covers, Bible Covers, Shower Chairs, Stationary, or the like.

The systems of the present disclosure may be used to improve staff efficiency. It is known that turnover in the medical industry is significant. In the medical industry, another common obstacle is rotating shifts. In both situations, there can be gaps in communication and confusion during the transitions. These obstacles can lead already confused patients to become agitated, can lead to misplacement of items, and can cause opportunities for mistakes to occur in patient care. The systems and methods of the present disclosure can alleviate the stress that can be experienced by patients because of the repetitive, single image concept.

While the changes occur, the patient may have peace and security within their living spaces and routines because the image remains constant. The systems also alleviate obstacles for staff. As new staff are onboarded, they can quickly learn the image attached to each patient and recognize it easily. As the staff rotates shifts, they will also become familiar with each patient and their image. It provides a way to organize, recognize, and mitigate loss of items, mix up of items, and lessens the possibility of mistakes. This system is not necessarily meant to replace numbered systems and requirements but may be used as an enhancement by providing a visual recognition technique, which may also be used to foster memory. In some embodiments, the care facility can also utilize the image theme by allowing staff members to select or create a unique image associated with each individual staff member. For example, the custom image can be embroidered or screen printed on scrubs, uniforms, or other items used during a shift.

In addition, laundry services can be an essential aspect to any care facility. Assuring that laundry is properly handled and returned to the correct person is important. With the identification system of the present disclosure, the image theme can be continued where a familiar single image can be associated with each patient's clothes, bed sheets, etc. In some embodiments, the images may be patches, tags, etc., that can be sewn, heat sealed, heat dye transferred, stamped, patched, screen printed, or embroidered items having the custom image for easy recognition. Some examples of laundry service items may include Facility Garment Racks, Laundry Bags and Liners, Linens, Pillowcases, Sheets, Bedspreads, Mattress Covers, Blankets, etc.

Tracking System

FIG. 1 is a block diagram illustrating an embodiment of a tracking system 100. In the embodiment illustrated, the tracking system 100 is configured to allow communication among various entities via a network 50, such as a telecommunications network. In embodiments, the network 50 includes one or more of the Internet, wide area networks (WAN), local area network (LAN), etc. Also, in embodiments, the network 50 includes multiple access nodes 52, such as cellular towers and small cells (low-powered cellular radio access nodes), and other cellular-based equipment for enabling wireless cellular communication. Also, in some embodiments, the network includes multiple satellites 54 for enabling wireless satellite communication (e.g., for global positioning system (GPS) communication).

As shown, in embodiments, the tracking system 100 includes one or more tracking devices 150 that are one or more of worn and carried by a person or individual whom a supervisor (e.g., parent, medical staff, assisted living staff, parole officer, etc.) wishes to track. In embodiments, the tracking devices 150 are secured to the wearer (e.g., child, family member, patient, medically comprised, parolee, or other subordinate) who is under observation and is to be tracked. In some embodiments, secure attachment includes applying an indestructible band (e.g., comprising titanium or other suitable material) around the wrist or ankle of the wearer that cannot be easily removed without a key or other security device. The position of the wearer, by way of a tracking device 150, is tracked by the management system 110, directly or indirectly, using the wireless communication, such as GPS tracking technology, cellular positioning technology, and the like.

Before the individuals (i.e., wearers who carry the tracking device 150) can be tracked, the tracking system 100 of FIG. 1 includes other communication to set up the system. In embodiments, a management system 110, is configured to control the operations of the tracking system 100 and to customize the tracking processes of the present disclosure. One or more clients 140 (e.g., accessed by a user, such as parents, medical staff, eldercare facilities, parole officers, etc.), are used to set up an account for the user establishing the tracking of one or more individuals. In embodiments, the clients 140 are computing devices, such as a computer or a mobile device, that each include one of an application and a web browser (utilized to access a web portal). In the case of parent users, each family may have an account that can be managed by one or both of the parents, whereby the family may have one or more children that the parents wish to track in order to keep tabs on the location of each of the children at all times (when the child is wearing the respective tracking device). In the case of a medical facility users (e.g., hospital, healthcare facility, assisted living facility, nursing home facility, senior living facility, eldercare facility, etc.), the facility may establish an account that can be managed by one or more staff members, whereby staff members may wish to keep tabs on one or more patients or residents of the facility. In addition, in the case of a criminal justice user (e.g., department of justice, parole board, bondsman, etc.), a supervisory entity (e.g., parole board) may have an account that can be managed by one or more managers (e.g., parole officers), whereby the parole officers may wish to keep tabs on one or more parolees. Other similar use cases can be conceived using the systems and methods described in the present disclosure.

In order to set up an account, the user uses a client 140 to communicate with the management system 110 via a client portal 105. In embodiments, the client portal is accessed via an application or a web browser on the client 140. In embodiments, the client portal 105 provides a firewall for protecting the management system 110 and provides graphical user interfaces for enabling the clients to enter data, such as account information, information about each of the tracked individuals, enabling tracking requests, providing a location history of the tracked individuals, and the like.

According to some embodiments, the tracking system of FIG. 1 further includes a manufacturing facility 90 associated with the management system 110, directly or indirectly. For example, in order to customize a unique tracking device 150 for each individual, based on the identity of the individual, name, address, gender, size, and other identifying information, the manufacturing facility 90 is configured to create a unique tracking device 150 (e.g., with unique tracking information) that is used identify the individual. Also, in embodiments, the manufacturing facility 90 utilizes different sizes of wristbands, ankle bands, necklaces, lanyards, etc. based on the size of the individual.

In some embodiments, as will be described in further detail below, at least one unique image is incorporated on the tracking device 150, such as via an image component 170, to further help with identifying an individual. In these embodiments, the image component 170 with the image is secured to the tracking device 150, such as by printing, sewing, and the like. In embodiments, the image component 170 is a separate component that is joined to the tracking device 150, such as via a snap-fit. In a snap-fit, the image component 170 interlocks with another portion of the tracking device 150 upon being pressed together, such that the separate component cannot be easily removed therefrom. Other suitable ways to apply the image component 170 to the tracking device 150 are also contemplated. In embodiments, the image component 170 is utilized to identify one or more attributes of the wearer, such as to particularly identify the wearer.

The users may also order other items with a copy of the image thereon via the management system 110, which can then instruct the manufacturing facility 90 to create such items for the users. These other items can be used to associate those items with the wearer of the tracking device 150.

Management System

Figure 2:
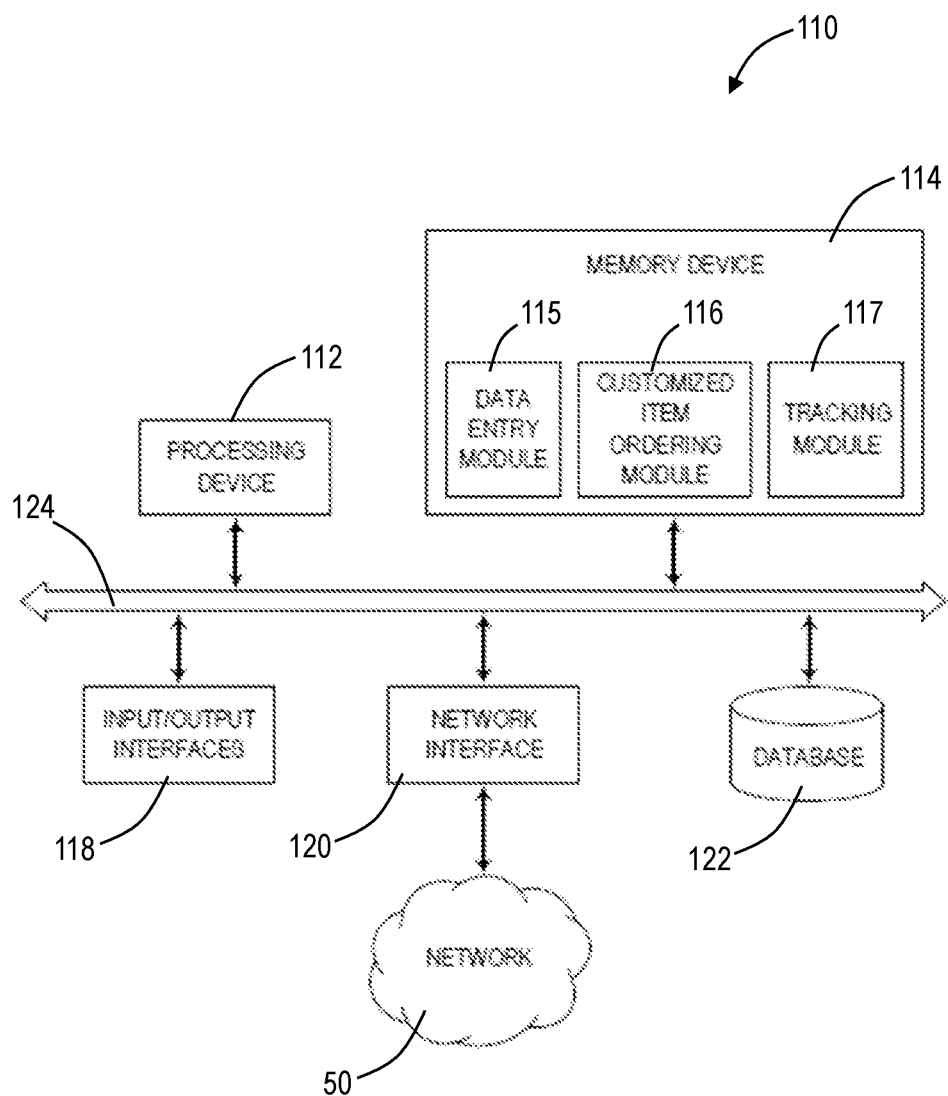
FIG. 2 is a block diagram illustrating an embodiment of the management system shown in the tracking system of FIG. 1.

FIG. 2 is a block diagram illustrating an embodiment of the management system 110 shown in the tracking system 100 of FIG. 1. In embodiments, the management system 110 is included within the communication network 50. In the illustrated embodiment, the management system 110 is a digital computer that, in terms of hardware architecture, generally includes a processing device 112, a memory device 114, input/output (I/O) interfaces 118, a network interface 120, and a database 122. In embodiments, the memory device 114 includes a data store, database, or the like. It should be appreciated by those of ordinary skill in the art that FIG. 2 depicts the management system 110 in a simplified manner, where practical embodiments may include additional components and suitably configured processing logic to support known or conventional operating features that are not described in detail herein. The processing device 112, memory device 114, I/O interfaces 118, network interface 120, and database 122 are communicatively coupled via a local interface 124. The local interface 124 may be, for example, but not limited to, one or more buses or other wired or wireless connections. The local interface 124 may have additional elements, which are omitted for simplicity, such as controllers, buffers, caches, drivers, repeaters, receivers, among other elements, to enable communications. Further, the local interface 124 may include address, control, and/or data connections to enable appropriate communications among the components.

The processing device 112 is a hardware device adapted for at least executing software instructions. The processing device may be any custom made or commercially available processor, a central processing unit (CPU), an auxiliary processor among several processors associated with the management system 110, a semiconductor-based microprocessor (in the form of a microchip or chip set), or generally any device for executing software instructions. When the management system 110 is in operation, the processing device 112 is configured to execute software stored within the memory device 114, to communicate data to and from the memory device 114, and to generally control operations of the management system 110 pursuant to the software instructions.

It will be appreciated that some embodiments of the processing device described herein may include one or more generic or specialized processors (e.g., microprocessors, Central Processing Units (CPUs), Digital Signal Processors (DSPs), Network Processors (NPs), Network Processing Units (NPUs), Graphics Processing Units (GPUs), Field Programmable Gate Arrays (FPGAs), and the like). The processing device 112 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 118 may be used to receive user input from and/or for providing system output to one or more devices or components. User input may be provided via, for example, a keyboard, touchpad, a mouse, and/or other input receiving devices. The system output may be provided via a display device, monitor, graphical user interface (GUI), a printer, and/or other user output devices, such as, to clients 140 via the client portal 105. I/O interfaces 118 may include, for example, a serial port, a parallel port, a small computer system interface (SCSI), a serial ATA (SATA), a fiber channel, InfiniBand, iSCSI, a PCI Express interface (PCI-x), an infrared (IR) interface, a radio frequency (RF) interface, and/or a universal serial bus (USB) interface.

The network interface 50 may be used to enable the management system 110 to communicate over a network, such as the network 50 shown in FIGS. 1 and 2, the Internet, a wide area network (WAN), a local area network (LAN), and the like. The network interface 120 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface may include address, control, and/or data connections to enable appropriate communications on the network.

The memory device 114 may include volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the memory device 114 may incorporate electronic, magnetic, optical, and/or other types of storage media. The memory device 114 may have a distributed architecture, where various components are situated remotely from one another, but can be accessed by the processing device. The software in memory device 114 may include one or more software programs, each of which may include an ordered listing of executable instructions for implementing logical functions. The software in the memory device 114 may also include a suitable operating system (O/S) and one or more computer programs. The operating system (O/S) essentially controls the execution of other computer programs, and provides scheduling, input-output control, file and data management, memory management, and communication control and related services. The computer programs may be configured to implement the various processes, algorithms, methods, techniques, etc. described herein.

The memory device 114 may include a data store used to store data. In one example, the data store may be located internal to the management system 110 and may include, for example, an internal hard drive connected to the local interface in the management system. Additionally, in another embodiment, the data store may be located external to the management system and may include, for example, an external hard drive connected to the I/O interfaces 118 (e.g., SCSI or USB connection). In a further embodiment, the data store is connected to the management system 110 through a network and may include, for example, a network attached file server.

Moreover, some embodiments may include a non-transitory computer-readable storage medium having computer readable code stored in the memory device 114 for programming the management system or other processor-equipped computer, server, appliance, device, circuit, etc., to perform functions as described herein. Examples of such non-transitory computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by the processing device 112 that, in response to such execution, cause the processing device 112 to perform a set of operations, steps, methods, processes, algorithms, functions, techniques, etc. as described herein for the various embodiments.

In the embodiment of FIG. 2, the memory device 114 may include an operating system, along with programs or code for enabling the processing device to perform various operations related to tracking individuals and coordinating images with individuals and personal property as described in the present disclosure. For example, in embodiments, the memory device 114 includes a data entry module 115, a customized item ordering module 116, and a tracking module 117.

In embodiments, the data entry module 115 is configured to enable a user, such as via the client 140, to create or establish an account to be able to track one or more individuals under the control/observation/supervision of an "overseer" (e.g., parent, health/eldercare staff member, parole officer, etc.) The overseer may be the same person or persons as the user or may be related to or associated with the user according to any suitable connection. The overseer may be a supervisor, manager, or other suitable leader or person in charge of caring for or responsible for the one or more individual's being tracked.

After an account is established, the data entry module 115 is configured to receive additional data provided by the user, such as via the client 140 regarding the entry of information about each of the individuals to be tracked. This information may include name, address, locations where the individual is free to roam, locations that are off-limits to the individual, identifying characteristics of the individual (e.g., age, gender, height, weight, birthmarks, tattoos, dental records, medical conditions, prescribed medications, etc.)

In some embodiments, the data entry module 115 is configured to receive images provided by a user from the client 140. The images, for example, may be requested by the user, via the client 140, to be associated with and put on a tracking device 150 as a unique image, such as on the image component 170. The user, via the client 140, may upload, create, select, enter, or otherwise provide an image for each image to the data entry module 115. In some embodiments, the management system 110 is configured to compare the image selected to be used as the unique image for a tracking device 150 to ensure that the image is unique and certifies that the image is unique to the tracking system 100 before allowing the image to be used as the unique image on a tracking device 150. In some embodiments, the management system 110 is also configured to associate the image with the tracking device 150. As such, in case of an emergency, the management system 110 can disseminate the image to authorities, family members, and the like when there is a search for the wearer of the tracking device 150 ongoing and in other similar situations.

In embodiments, the customized item ordering module 116 is configured to allow a user, such as via the client 140, to place an order to create a customized tracking device 150. As will be described in detail below, the tracking device 150 includes a tracking chip and the image for uniquely identifying an individual.

Also, the customized item ordering module 116 may be configured to allow the user to place an order for a manufactured item or for customizing an item with the image included thereon. A payment screen may also be associated with the customized item ordering module 116 to allow the user, such as via the client 140, to pay the manufacturing facility 90 for the items.

The tracking module 117 is configured to obtain and maintain tracking information related to the tracking device(s) 150. With the individuals being tracked, the user can access the client portal 105 to access current and historical information about the whereabouts of the tracking devices 150 and the individuals wearing those devices. In embodiments, the tracking module 117 is configured to receive information, such as the location information and whether the tracking device 150 is being worn, and the like, which is received over the network 50. In embodiments, the tracking module 117 is configured to allow a user to request the location of any of the tracking devices 150 associated with an account of the user.

Tracking Devices and Merchandise

Figure 3:
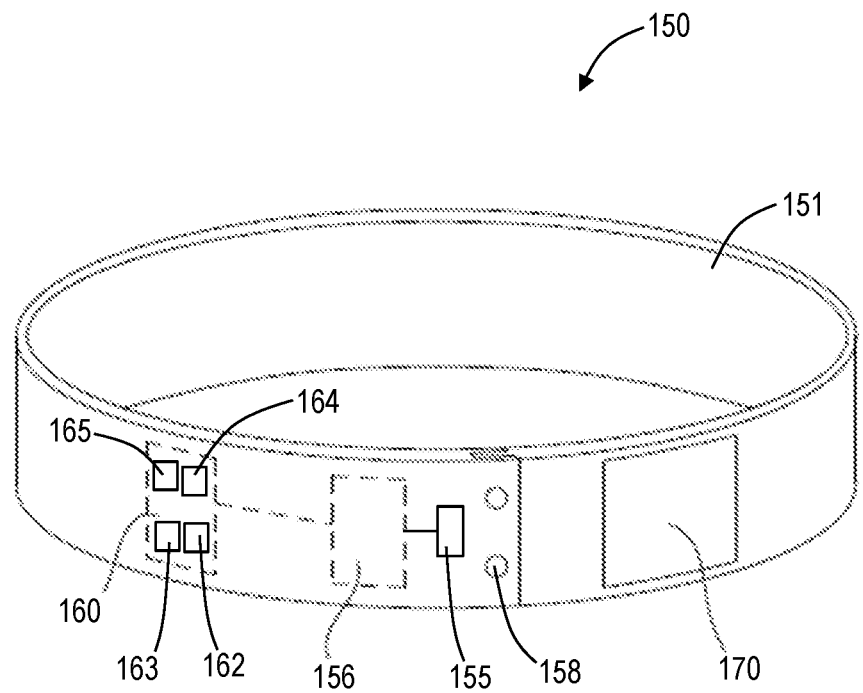
FIG. 3 is a perspective view of an embodiment of a tracking device of FIG. 1.

FIG. 3 is a perspective view of an embodiment of a tracking device 150 of FIG. 1. In embodiments, the tracking device 150 includes a band 151, a locking mechanism 158, an electronic tracking component 160, a battery 156, and an image component 170. In embodiments, the band 151 is one of a wrist band (such as a bracelet, bangle, and the like), ankle band, arm band, neck band, necklace, belt, and the like. While a relatively flat circular band is illustrated in FIG. 3, other shapes, cross-sections, and the like are also contemplated. In some embodiments, the band 151 includes ends that form a connection, such as a buckle, clip, snap, strap, and the like, for forming a loop around a specific body part of the wearer. As shown, the locking mechanism 158 includes one or more locks or other fixing elements for preventing the wearer from removing the band 150. For instance, in embodiments, the locking mechanism 158 is configured to only unlock using a suitable matching key. In embodiments, the band 151 is formed of or reinforced with titanium, polymer, or other suitable material or combination of materials that is difficult to destroy or cut through to prevent unauthorized removal of the tracking device 150.

The electronic tracking component 160 is embedded within the band 151. In embodiments, the electronic tracking component 160 includes a tracking chip 162, which enables the location tracking of the tracking device 150, such as by enabling GPS or other suitable tracking schemes for allowing the tracking system 100 to track the location of the tracking device 150 (and thereby the wearer). The electronic tracking component 160 is powered by a battery 156 or other suitable power source. In some embodiments, the tracking chip 162 is a passive chip, such as a Radio Frequency Identification (RFID) chip or a graphene based chip and the access nodes 52 are corresponding passive readers (such as an RFID reader) that are placed around a given location to track a location of the wearer.

In embodiments, the electronic tracking component 160 also includes a processing device 163, a memory device 164, input/output (I/O) interfaces 165, and other electronic components necessary for the operation thereof. The components of the electronic tracking component 160 may be similar to the components of the management system 110. However, in embodiments, the components of the electronic tracking component 160 are limited in size and processing power to ensure a battery life of the tracking device 150 is sufficient for tracking the individual without interruption. In some embodiments, the electronic tracking component 160 is configured to provide the location of the tracking device 150 to the management system 110 in a predetermined interval. In embodiments, the predetermined interval is selected to update regularly, while preserving the battery life of the battery 156, such as once every 10 seconds, once every 30 seconds, once every minute, and the like.

Furthermore, while the radios are configured to transmit and receive for obtaining a location of the tracking chip 162, in embodiments, the (I/O) interfaces 165 for wireless communication are configured for transmitting only (to conserve battery life), while the electronic tracking component 160 is configured to transmit that information on a regular interval. In some embodiments, the electronic tracking component 160 also includes physical interface 155. In embodiments, the physical interface 155 is used to charge the battery 156 and to communicate with the electronic tracking component 160, such as for input and output communication with the electronic tracking component 160 over a physical connection.

In some embodiments, the locking mechanism 158 is configured to electronically connect with one or more of the physical interface 155 and the electronic tracking component 160. In these embodiments, the locking mechanism 158 is adapted to one of unlock and become unlockable based on a received signal from one of the physical interface 155 and the electronic tracking component 160. In embodiments, a command for unlocking or configuring the locking mechanism for unlocking is received via one of the physical interface and near field communication with the electronic tracking component 160.

Figure 4:
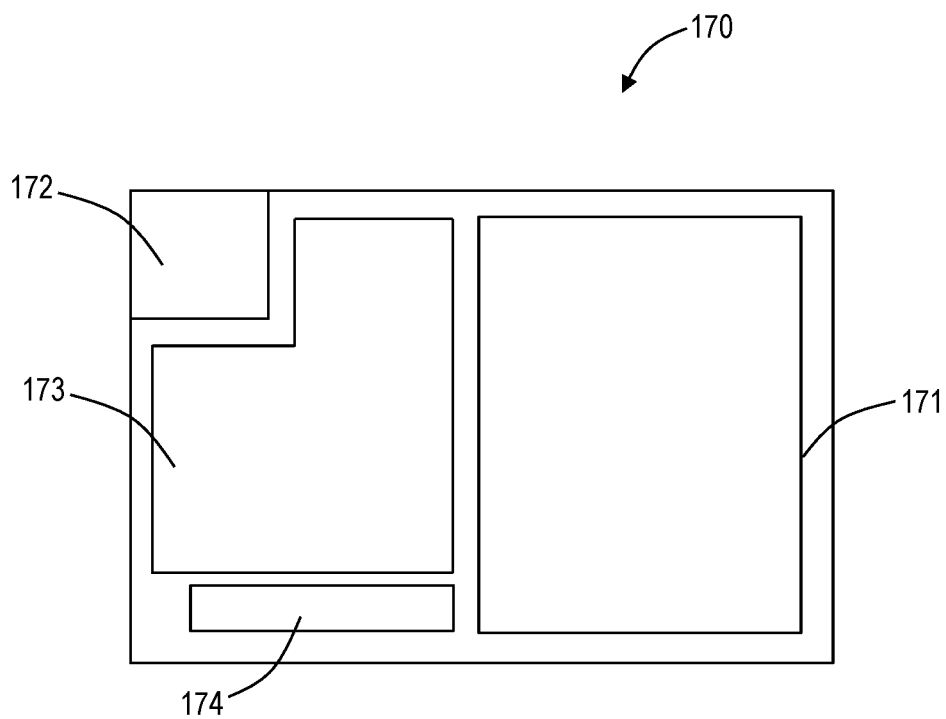
FIG. 4 is a schematic diagram illustrating an embodiment of an image component on the tracking device of FIG. 3.

FIG. 4 is a schematic diagram illustrating an embodiment of an image component 170 on the tracking device 150 of FIG. 3. The image component 170 includes one or more images 171, 172, 173, 174 that are on the tracking device 150. In some embodiments, the image component includes images that are formed/printed directly onto the band 151, such as by etching, screening, embroidering, and the like. In other embodiments, the image component 170 is a separate hardware component with the image formed/printed thereon that is joined to the band 151, such as by sewing, fastening, snapping via a snap-fit, inserting, and the like. In some embodiments with a snap-fit, the image component 170 is removable from inside the band 151, while not being worn, but is unremovable while the band 151 is being worn since the back of the image component 170 is inaccessible while being worn. In these embodiments, the image component 170 is secure while the tracking device 150 is being used, but can be easily swapped, if necessary, to another tracking device 150 if needed while the tracking devices 150 is not being used.

One of the images 171, 172, 173, 174 of the image component is a unique image that is selected specifically to identify the individual wearing the tracking device 150. In some embodiments, the image is a custom image made by the user or the wearer of the tracking device 150. In the embodiment illustrated, the image 171 is the unique image identifying the wearer of the tracking device 150, the image 172 is an image identifying a group associated with the wearer, such as a family symbol, a symbol identifying a hospital wing, or a symbol identifying a guardian, such as a parent. In some embodiments, the image 173 is a decorative image selected by the user or the wearer and the image 174 includes a name of the wearer. However, other images may also be used, such as any combination of visual pictures, photographs, names, addresses, phone numbers, mugshots, patient identification information, required medication, health conditions, and the like.

Figure 5:
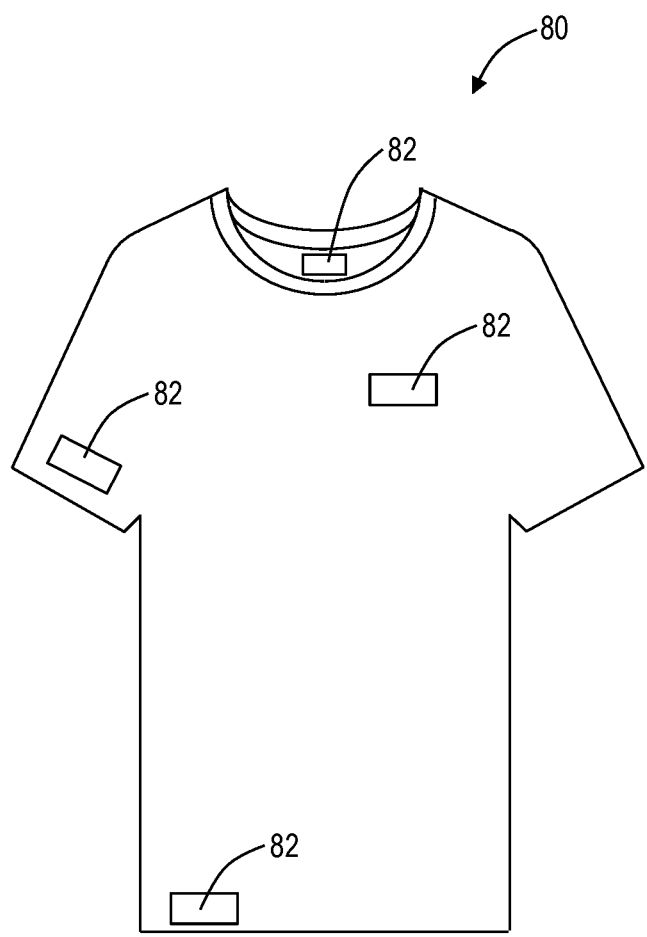
FIG. 5 is a diagram illustrating an example of merchandise that may be specifically ordered and purchased with the image applied thereto.

FIG. 5 is a diagram illustrating an example of merchandise 80 that may be specifically ordered and purchased with an image 82 applied thereto. Again, the image 82 is a copy of the one or more images 171, 172, 173, 174 of the image component 170, including the unique image for identifying an individual. In the embodiment illustrated, the merchandise 80 is a shirt. In some embodiments, property of the individual being tracking/monitored is provided with the image 82 thereon. In this way, there will normally be little confusion about the owner of the personal property since this image 82 is unique to the individual. While a shirt is shown in FIG. 5, it should be noted that the merchandise 80 may include any item (e.g., pants, socks, hat, notebook, mug, etc.). In this example, the image 82 is applied (e.g., sewn, patched, etc.) onto the shirt. The image 82 can be applied at any location on the shirt, such as on an inside of the shirt, on a sleeve, at a base, and in a centrally located position.

In some embodiments, the merchandise 80 is provided for a supervisor of the wearer, such as a parent, camp director, nurse, and the like. In some embodiments, the merchandise 80 includes images 82 associated with each individual that the supervisor is in charge of. In some of these embodiments, each of the group includes a group image 172 and the image 82 for the supervisor includes a copy of the group image 172.

Also, in some embodiments, the tracking device 150 is configured to be joined to the merchandise 80, such as being applied to or affixed to the shirt (or other item of merchandise) that. For instance, in some embodiments, the tracking device 150 is sewn into a sleeve or hem of the merchandise.

Medical Information

Returning again to FIG. 2, in embodiments, the data entry module 115 of the management system 110 is configured to obtain medical information of a patient, such as a patient in a hospital, mental hospital, urgent care facility, emergency room, or other types of medical facilities. A nurse, doctor, administrator, or other person working in one of these medical facilities may be enabled, using data entry means (e.g., input/output interfaces) to enter the name, address, phone number, and other personal information of the patient. In addition, medical information (e.g., medical condition, health history, chronic health problems, current medications, etc.) about the patient may be entered.

Figure 6:
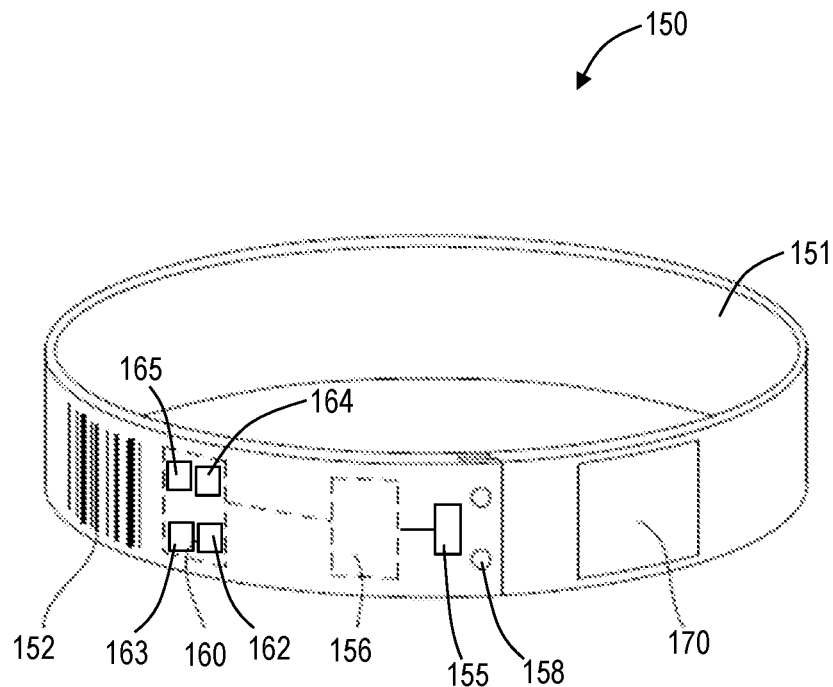
FIG. 6 is a perspective view of another embodiment of the tracking device.

FIG. 6 is a perspective view of another embodiment of the tracking device 150. As illustrated, in embodiments, the tracking device 150 of FIG. 6 the same features of the tracking device 150 shown in FIG. 3. However, in the embodiment illustrated in FIG. 6 the tracking device 150 further includes a scannable code 152 that is configured to identify the wearer, such as a medical record number, and the like, which can be scanned for accessing such records. In embodiments, the scannable code 152 is one of a barcode and a matrix code, such as a Quick Response code. In some embodiments, the electronic tracking component 160 is configured to store the patient information.

In some embodiments, the scannable code 152 is embedded in the image component 170. By embedding the scannable code 152 in the image component, such as within one of the images thereon, the function of the tracking device 150 as being such a device can be concealed to avoid the tampering therewith.

The scannable code 152 can be scanned by first responders, doctors, or other emergency personnel in the event that the patient information needs to be accessed for medical reasons. For example, if a patient is unresponsive, information about the patient's prescribed medications may be critical with regard to the type of care that may be needed for the patient. As such, the emergency personnel may access the medical history and/or other information of the patient in an accident. Also, the patient information may include emergency contact information so that the doctors, first responders, etc. may contact loved ones as needed.

In some embodiments, the scannable object (e.g., barcode) may be replaced with any suitable type of electronic interface, such as near-field communication, that is electrically connected to the memory device 164. In this way, a first responder may utilize an associated device having a corresponding scanning/reading device for communicating with the electronic interface in order to access the patient information.

Baby/Infant Tagging

Figure 7:
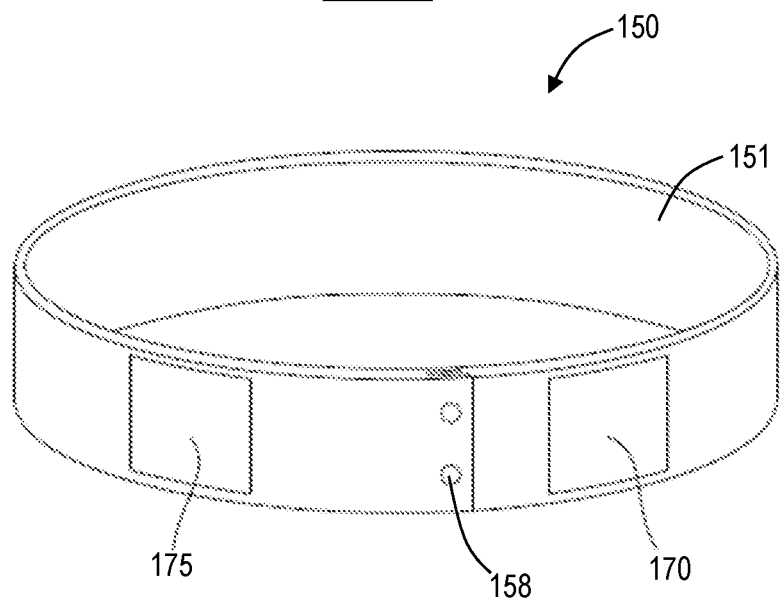
FIG. 7 is a perspective view of a further embodiment of the tracking device.

FIG. 7 shows another embodiment of tracking device 150. In the embodiment illustrated, the tracking device 150 can be used for babies, infants, and/or other people who may be incapable of speaking for themselves. For example, in the embodiment of FIG. 7, the tracking device 150 includes two image components 170, 175. As noted above, the image component 170 includes a unique image that identifies the wearer (e.g., baby, infant, patient, etc.) thereof, while the other of the image components 175 includes a unique image that identifies one or more supervisors (e.g., one or both parents, grandparents, guardians, caregivers, etc.). In one embodiment, the image component 170 includes an image of the baby, while the other image component 175 includes an image of the parents (e.g., mother and father of the baby). Any number of image components may be applied to the strap 151 depending on the number of people who care for, are related to, or in any way are responsible for the well-being of the wearer, such as a baby or infant.

In some embodiments, as shown in FIG. 7, the tracking device 150 does not include the electronic tracking component 160, while in other embodiments, the tracking device 150 of FIG. 7 includes all of the components of the tracking devices of FIGS. 3 and 6.

Furthermore, in some embodiments, secondary tracking devices 150 (without the electronic tracking component 160) are provided for supervisors, such as parents, that include an image component 170 for each of the individuals the supervisors are responsible for, such as for each child of parents, twins in a hospital, and the like. For example, a first tracking device 150 is provided for the wearer (e.g., baby), while at least one other, associated, tracking device 150 is provided for a supervisory person (e.g., one or more parents). In this case, the parents too can each wear a band having the same images showing their baby and their own picture. As such, in embodiments, the tracking system 100 is also used for verification of the proper parents, for security, and ensuring that there are no mix-ups among similar-looking babies.

The tracking devices 150 are formed using any suitable sizes depending on the intended wearers. For example, a small sized band may be custom created with the wearer's information to fit around the wrist or ankle of a baby, while larger sized bands may be created to fit around the wrist or ankle of the parents. In some embodiments, the bands 151 may include size adjusting features so that they may be fitted for the specific wearer. For example, a baby size may have a range that can accommodate most babies within a normal range of newborns. Other size ranges may accommodate infants, toddlers, young children, adults, large adults, etc. Also, size ranges may be configured to accommodate wrists, ankles, or other parts of the body.

Tracking Device Charms

Figure 8:
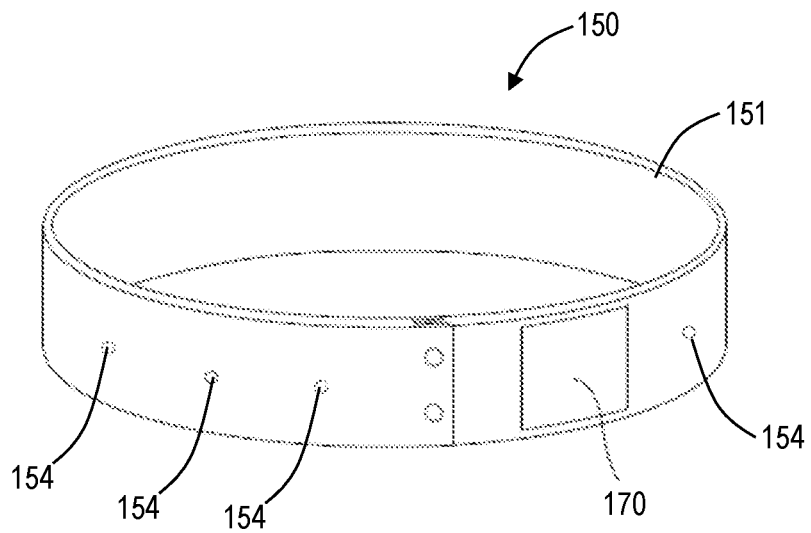
FIG. 8 is a perspective view of a further embodiment of the tracking device.
Figure 9:
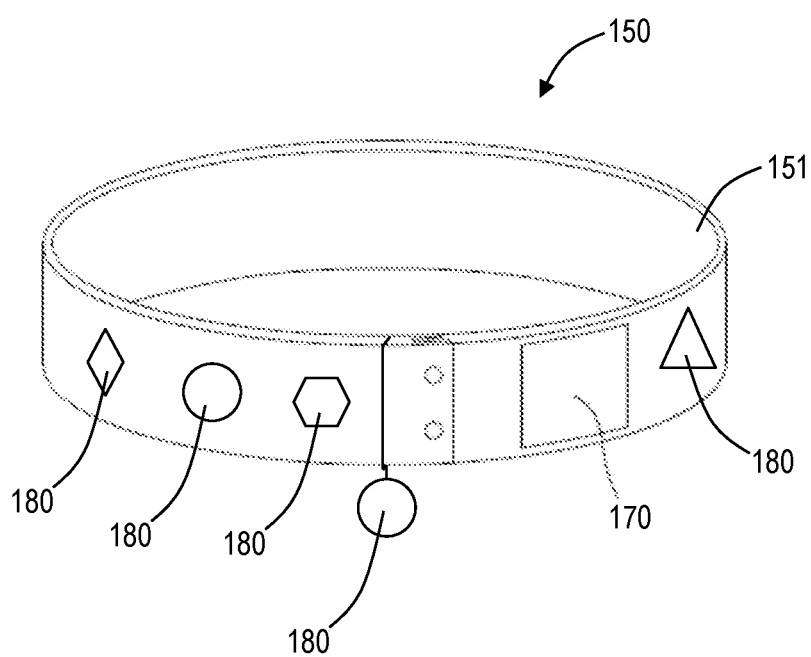
FIG. 9 is a perspective view of the tracking device of FIG. 8.

FIG. 8 is a perspective view of a further embodiment of the tracking device 150. FIG. 9 is a perspective view of the tracking device 150 of FIG. 8. As can be seen in FIGS. 8 and 9, in embodiments, the tracking device 150 is configured to receive charms 180. In the embodiment illustrated in FIG. 8, the band 151 includes charm connectors 154 for connecting charms 180 thereto. In some embodiments, the charm connectors 154 are snaps that receive protrusions on the back of the charms 180. In other embodiments, the charm connectors 154 are magnets adapted to attract at least a portion of the charms 180 via magnetism for connecting the charm 180 to the band 151. In some embodiments, the magnets are embedded below the surface of the band 151 so that the charm connectors 154 are not visible on the exterior of the band 151. In further embodiments, the charms 180 include the magnet for connecting to a metallic surface of the band 151.

Cloth Tracking Device

Figure 10:
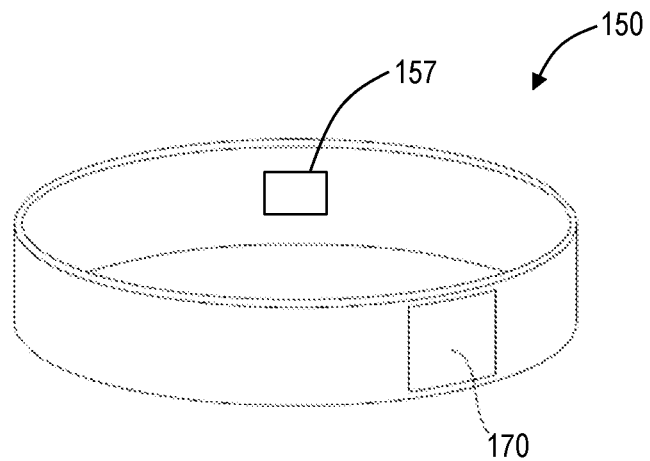
FIG. 10 is a perspective view of a further embodiment of the tracking device.

FIG. 10 is a perspective view of a further embodiment of the tracking device 150. In the embodiment illustrated in FIG. 10, the tracking device is a cloth band. In some embodiments, the cloth band includes elastic for securing the tracking device 150 to the body of the wearer, such as an arm, a leg, or the head of the wearer. In embodiments, the tracking device 150 of FIG. 10 includes the image component 170 secured thereto, such as by sewing. In some embodiments, the tracking device 150 includes an internal pocket 157 that is adapted to hold the tracking component 160, the battery 156, and the physical interface 155.

Tracking Jewelry

Figure 11:
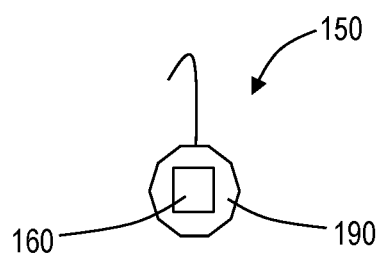
FIG. 11 is a perspective view of a further embodiment of the tracking device.
Figure 12:
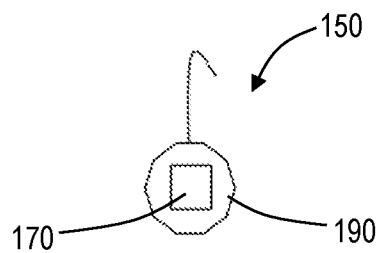
FIG. 12 is a perspective view of the tracking device of FIG. 11.

FIG. 11 is a perspective view of a further embodiment of the tracking device 150. FIG. 12 is a perspective view of the tracking device 150 of FIG. 11. In the embodiment illustrated in FIG. 11, the tracking device 150 is an earring and includes the electronic tracking component 160 embedded or on a back of the ornament 190. In the embodiment illustrated in FIG. 12, the tracking device 150 includes the image component 170 on a back of the ornament 190 thereof. In some embodiments, both the electronic tracking component 160 and the image component 170 in a single earing. In other embodiments, one earring includes the electronic tracking component 160 while another earring includes the image component 170. While the earring in FIGS. 11 and 12 are illustrated as a dangle earring, other styles, such as stud earrings, are also contemplated.

Figure 13:
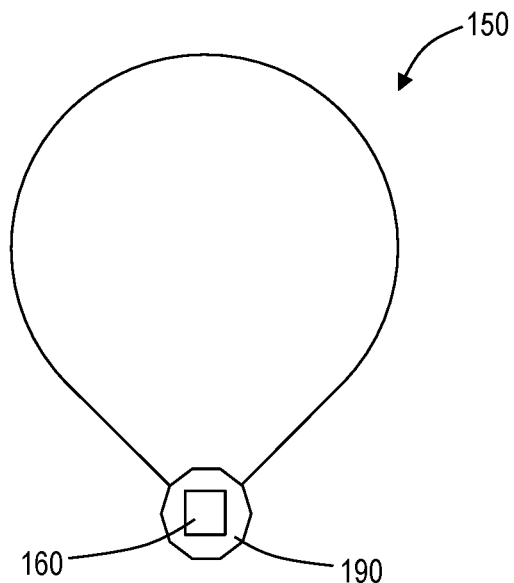
FIG. 13 is a perspective view of a further embodiment of the tracking device.
Figure 14:
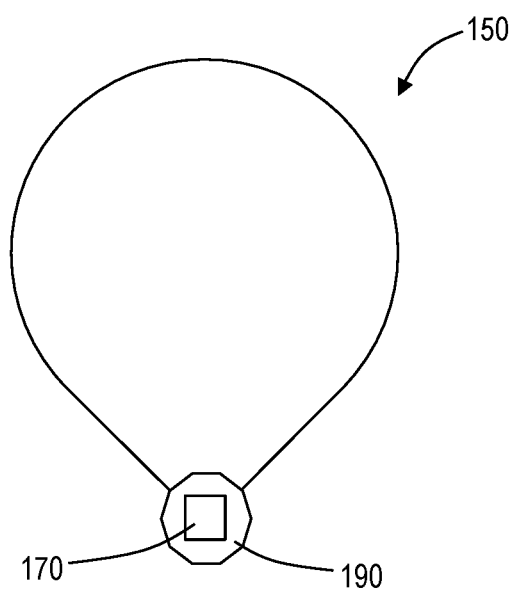
FIG. 14 is a perspective view of the tracking device of FIG. 13.

FIG. 13 is a perspective view of a further embodiment of the tracking device 150. FIG. 14 is a perspective view of the tracking device 150 of FIG. 13. In the embodiment illustrated in FIGS. 11 and 12, the tracking device 150 is a necklace and includes the electronic tracking component 160 embedded in the ornament 190 (such as a pendant) and includes the image component 170 on a back of the ornament 190. In some embodiments, the necklace only includes one of the electronic tracking component 160 and the image component 170 with the ornament 190. Other configurations are also contemplated.

Figure 15:
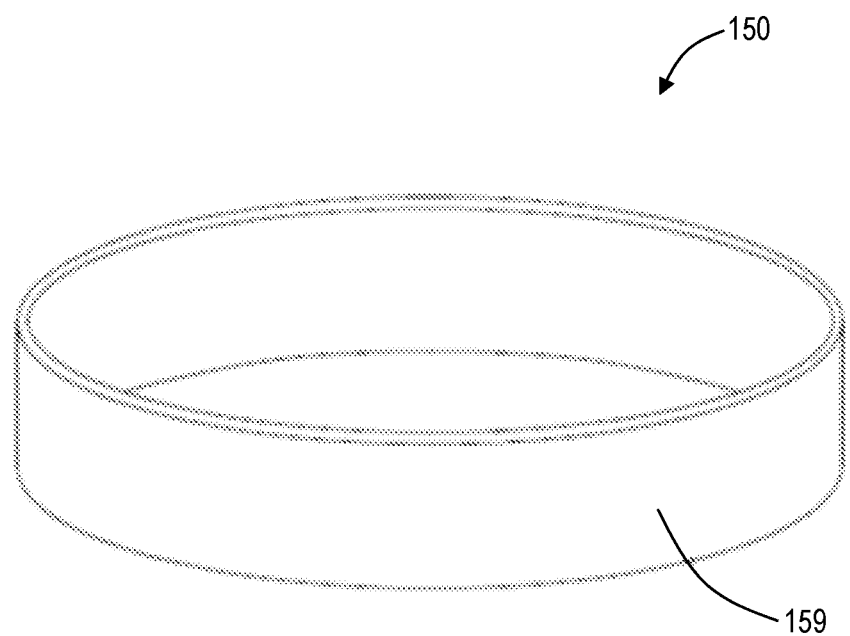
FIG. 15 is a perspective view of a further embodiment of the tracking device 150.

FIG. 15 is a perspective view of a further embodiment of the tracking device 150. In the embodiment illustrated in FIG. 15, the tracking device 150 includes a cover 159 that is adapted to cover the band 151, such that the image component 170 and the locking mechanism 158 are not visible but are still easily accessible. In this manner, the tracking device 150 does not appear to be a tracking device 150, but rather a simple ornament, such as a bracelet, that the person is wearing.

Tracking Method

Figure 16:
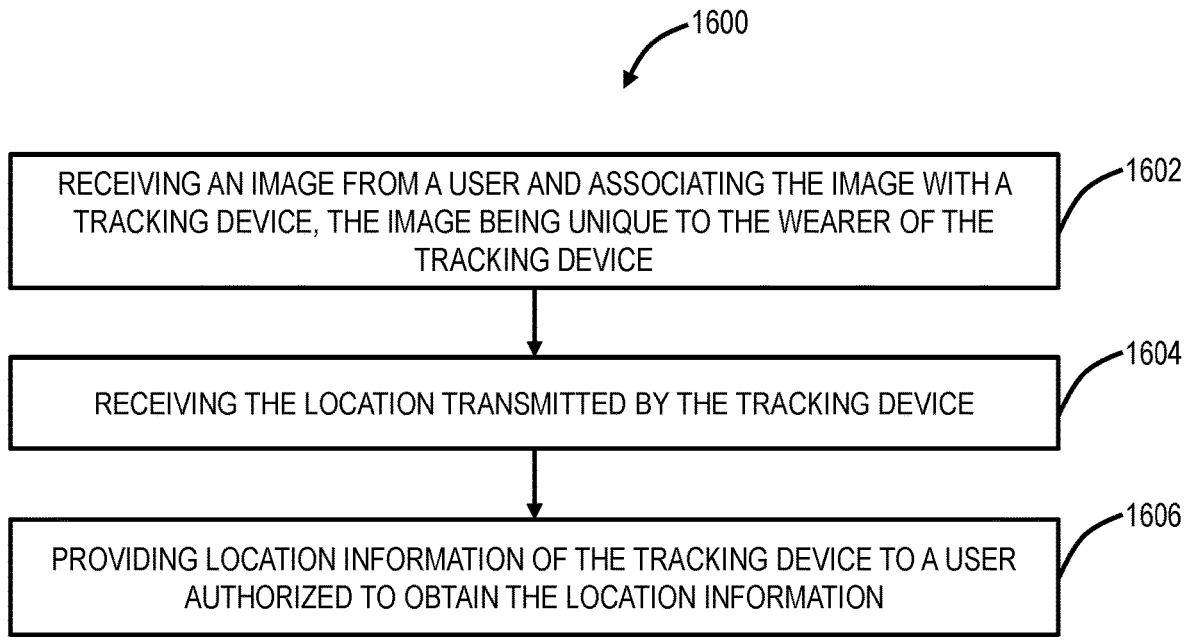
FIG. 16 is a flowchart of a method for tracking a person with a tracking system.

FIG. 16 is a flowchart of a method 1600 for tracking a person with a tracking system. The method includes receiving an image from a user and associating the image with a tracking device, the image being unique to the wearer of the tracking device at step 1602. The method also includes receiving the location transmitted by the tracking device at step 1604. The method further includes providing location information of the tracking device to a user authorized to obtain the location information at step 1606.

In some embodiments, the method also includes comprising providing the image to a manufacturing facility for manufacturing the image component and for manufacturing merchandise with the image printed thereon. In some embodiments, the method includes associating a second image with the image, the second image identifying one of a supervisor and a group associated with the person wearing the tracking device. In some embodiments, the image is certified by the management system as being unique prior to being applied to the tracking device.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A tracking device, comprising:
a band adapted to be secured to a body of a person;
an electronic tracking component embedded within the band, the electronic tracking component configured to track a location of the tracking device and provide the location of the tracking device to a management system;
an image component including an image that is unique to and identifies the person wearing the tracking device; and
wherein the image component includes a plurality of images including the unique image and an image identifying one of a supervisor and a group associated with the person wearing the tracking device.

2. The tracking device of claim 1, wherein the image component is a separate component that is joined to the band and is joined to the band by one of sewing, fastening, and snapping via a snap-fit.

3. The tracking device of claim 1, further comprising a locking mechanism that is adapted to prevent the wearer from removing the tracking device.

4. The tracking device of claim 1, further comprising a scannable code configured to identify the person wearing the tracking device.

5. The tracking device of claim 4, wherein the scannable code is embedded in the image of the image component.

6. The tracking device of claim 1, wherein the image is certified by the management system as being unique prior to being applied to the tracking device.

7. The tracking device of claim 1, wherein the electronic tracking component is configured to transmit the location of the tracking device to the management system on a predetermined interval.

8. A tracking system, comprising:
a tracking device including
a band adapted to be secured to a body of a person;
an electronic tracking component embedded within the band, the electronic tracking component configured to track a location of the tracking device and transmit the location of the tracking device; and
an image component including an image that is unique to and identifies the person wearing the tracking device; and
a management system configured to receive the location transmitted by the tracking device, provide location information of the electronic tracking component to a user authorized to obtain the location information, and store a copy of the image that is unique to and identifies the person wearing the tracking device and associate the image with the tracking device,
wherein the image component includes a plurality of images including the unique image and an image identifying one of a supervisor and a group associated with the person wearing the tracking device and the management system further associates the image identifying the one of the supervisor and the group with the unique image.

9. The tracking system of claim 8, wherein the image component is a separate component that is joined to the band and is joined to the band by one of sewing, fastening, and snapping via a snap-fit.

10. The tracking system of claim 8, wherein the tracking device further includes a locking mechanism that is adapted to prevent the wearer from removing the tracking device.

11. The tracking system of claim 8, wherein the tracking device further includes a scannable code configured to identify the person wearing the tracking device.

12. The tracking system of claim 11, wherein the scannable code is embedded in an image of the image component.

13. The tracking system of claim 8, wherein the management system is configured to certify the image as being unique prior to the image being applied to the tracking device.

14. The tracking system of claim 8, wherein the electronic tracking component is configured to transmit the location of the tracking device to the management system on a predetermined interval.

15. A method for tracking an individual with a management system of a tracking system, comprising:
receiving an image from a user and associating the image with a tracking device, the image being unique to the wearer of the tracking device, the tracking device including a band adapted to be secured to a body of the wearer, an electronic tracking component embedded within the band configured to track a location of the tracking device and provide the location of the tracking device to a management system, and an image component including the image;

receiving the location transmitted by the tracking device; and providing location information of the tracking device to a user authorized to obtain the location information; and further comprising providing the image to a manufacturing facility for manufacturing the image component and for manufacturing merchandise with the image printed thereon.

16. The method of claim 15, further comprising providing the image to a manufacturing facility for manufacturing the image component and for manufacturing merchandise with the image printed thereon.

17. The method of claim 15, wherein the image is certified by the management system as being unique prior to being applied to the tracking device.

\* \* \* \* \*